United States Patent [19]
Campbell

[11] Patent Number: 5,270,070
[45] Date of Patent: Dec. 14, 1993

[54] METHOD OF DIVIDING A PLURALITY OF STREAMS OF DOUGH INTO DOUGH BALLS

[76] Inventor: Sterrett P. Campbell, 995 Peachtree Dunwoody Ct., Atlanta, Ga. 30328

[21] Appl. No.: 951,180
[22] Filed: Sep. 24, 1992
[51] Int. Cl.$^5$ ............................................. A21D 6/00
[52] U.S. Cl. ................................. 426/503; 425/311; 426/518
[58] Field of Search ............... 426/503, 504, 496, 516, 426/517, 518; 425/202, 204, 208, 311, 332

[56] References Cited

U.S. PATENT DOCUMENTS

| | | | |
|---|---|---|---|
| 2,867,000 | 1/1959 | Huszar | 425/332 |
| 4,008,025 | 2/1977 | Campbell | 425/96 |
| 4,306,850 | 12/1981 | Cummings | 425/332 |
| 4,332,538 | 1/1982 | Campbell | 425/140 |
| 5,046,940 | 9/1991 | Cummings | 425/239 |

Primary Examiner—George Yeung
Attorney, Agent, or Firm—Hopkins & Thomas

[57] ABSTRACT

Divider blades (44) are mounted to rotary support plate (22), and the rotary support plate is moved in a circular path so as to cause the divider blades to move across the dough outlet openings (23), thereby severing the dough protruding from the outlet openings and forming dough balls (60). The divider blades are maintained in continuous contact with the face (18) of the dough delivery block (14), and the lower slicing edges (50) of each divider blade moves down to the lower horizontal edge (20) of the dough delivery block so as to make sure that the dough is not allowed to cling to the dough delivery block.

8 Claims, 2 Drawing Sheets

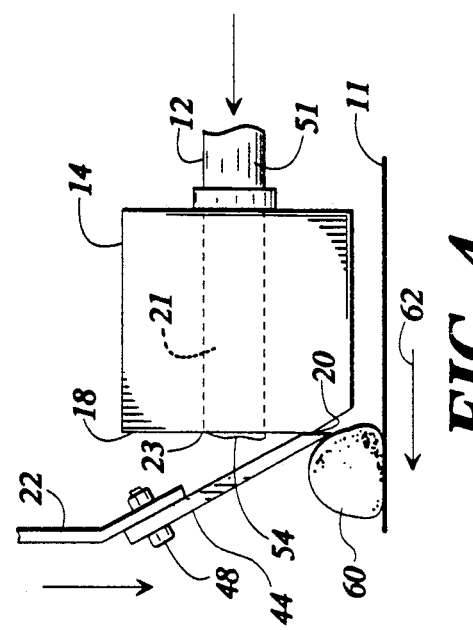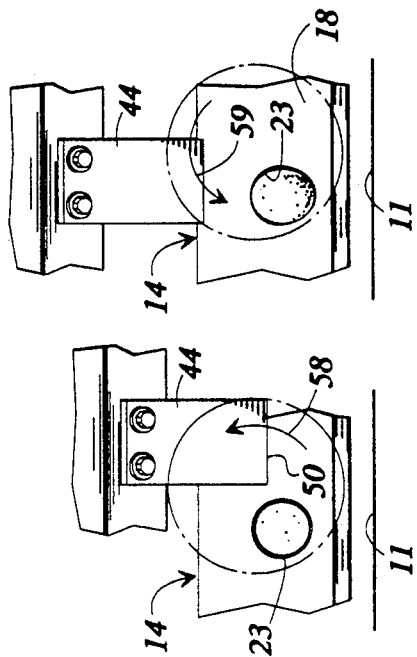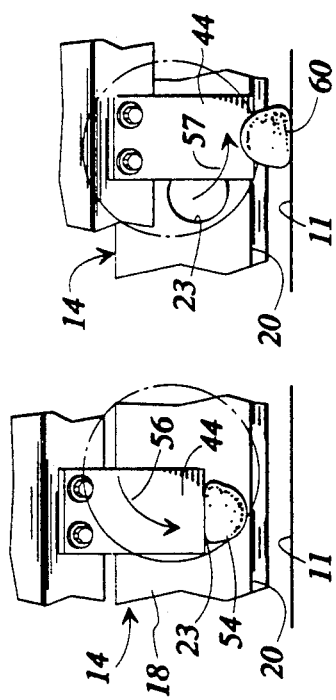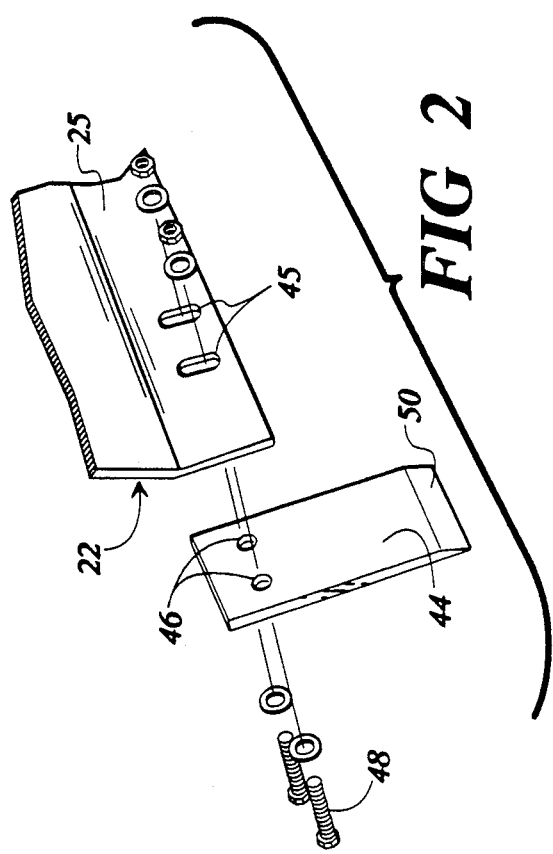

METHOD OF DIVIDING A PLURALITY OF STREAMS OF DOUGH INTO DOUGH BALLS

FIELD OF INVENTION

This invention relates to a divider for separating a plurality of streams of baker's dough into individual dough balls for further processing on a rounder bar assembly, delivery to pans, and subsequent proofing and baking procedures. More particularly, the invention relates to the method and apparatus for moving divider blades across the face of a dough delivery block behind dough moving from the streams of dough which protrude from conduits extending through the block, so as to sever the leading end portions of the streams of dough away from the block and move the dough balls downwardly into positive contact with the surface conveyor of the rounder bar system.

BACKGROUND OF THE INVENTION

In the processing of baker's dough, an accepted method of forming dough balls of consistent size and density is to move baker's dough with a stuffing pump through a dough separator manifold, and then move the separated streams of dough from the dough separator manifold through a dough delivery block. The dough moving in separate streams through the dough delivery block is continually divided into balls of dough by moving divider blades across the openings of the dough delivery block to sever the leading ends of the streams of dough protruding from the dough delivery block. The cut balls of dough are allowed to fall to the surface conveyor of the rounder bar assembly positioned below the dough delivery block.

Prior art rounder bar systems are disclosed in U.S. Pat. Nos. 4,008,025 and 4,306,850.

With the above noted process, it is important that each stream of dough is maintained at equal density and moves at equal velocity. Thus, when the divider blades sweep in unison across the dough outlet openings of the dough divider block, balls of dough of equal weight will be formed.

One of the difficult functions of the foregoing process is to divide the dough balls from the ends of the dough streams and to deliver the dough balls simultaneously to the moving surface conveyor of the rounder bar assembly so that the dough balls are placed in aligned lateral rows on the conveyor. This is important because the dough balls, after moving in contact with the rounder bars, should be delivered to the awaiting pans in lateral lines, so that the dough balls as received in the pans are laterally aligned.

In some of the prior art divider systems, the dough balls tend to cling to the dough delivery block or other associated elements, which disrupts the timing of the dough balls as they are received on the surface conveyor system. In addition, some of these systems plow straight through the dough extrusion causing a tearing (vs. slicing) of the gluten strands at the exit surface of both the dough ball being formed and the front surface of the following dough ball. Since a tearing of the gluten strands (vs. slicing) can cause a failure of the cell structure to develop properly in later processing, this tearing action can cause imperfections in the final product and, in particular, on the surface of the baked out bun or loaf resulting in a degeneration in the perception of over-all quality.

Another problem of the prior art is that the construction and operation of the dough divider blades is somewhat complex, expensive and difficult to maintain. For example, U.S. Pat. Nos. 4,332,538 and 5,046,940 both show dough divider blades that have a complex motion where the blades pivot to move into contact with the dough delivery block, the blades then move in arcs downwardly across the dough outlet openings to sever the dough balls from the oncoming streams of dough, and then the blades pivot away from the oncoming streams of dough for movements in upward arcs for a return motion. These extra pivoting motions require linkages that must be manufactured and maintained. When the number of the dough streams to be divided is four, six, or eight streams, the linkages and movements of the prior art dough divider blades are cumbersome, and special structures have to be used to move the blades in unison so that the dough balls drop in timed relationship to the surface conveyor of rounder bar system. In addition, it is difficult to insure, with these systems, that the plunging blade is in imminent contact with the cut off block. Should any gap exist, then the gluten strand tearing problem referred to above is dramatically increased.

A further advantage of the slicing action of the blades that are a subject of the patent is that the slicing action tends to minimize dough contact with the slicing blade so that, once the dough piece is released from the cut off block, it will release easily from the cut off blade. In addition, the slicing action tends to impart a rounding effect on the trailing half of the dough piece, providing severed dough pieces that are almost round as they leave the cut off block. This result can be of great value if the dough balls were to be deposited directly from the cut off knife into baking pans.

SUMMARY OF THE INVENTION

Briefly described, the present invention comprises a dough divider method and apparatus which includes a plurality of dough divider blades mounted on a common rotary support plate, with each divider blade oriented at an angle and biased into positive contact with the face of a dough delivery block. The rotary support plate is oscillated in a circular path and its divider blades are arranged to move in downward arcs across each of the dough outlet openings of the dough delivery block, thereby severing the leading end of the streams of dough moving through the dough outlet openings, so as to form dough balls.

The divider blades move in continuous contact with the face of the dough delivery block, and move to a lower-most position which extends to the lower edge of the dough delivery block, thereby completely clearing the dough ball from the dough delivery block. The surface conveyor of the rounder bar assembly is maintained in closely spaced relationship with respect to the dough divider, so that the dough balls make contact with the surface conveyor before or as the dough balls lose contact with the divider blades. This positively controls the movements of the shapeless and sometimes unpredictable dough balls, and prevents the dough balls from clinging to the dough delivery block, so that the dough balls are placed in lateral alignment on the surface conveyor of the rounder bar system.

Once the divider blades have reached their bottom dead-center positions, they continue to move in a circular path, through an upward arc back between the dough outlet openings of the dough delivery block to return to their initial positions. In the meantime, the divider blades maintain continuous surface-to-surface contact with the face of the dough delivery block, thereby avoiding any additional linkages and other components that would require additional movements.

Thus, it is the object of the present invention to provide an improved dough divider which is simple in design and operation, and which consistently divides the leading end portions of streams of dough into equal sized dough balls and delivers the dough balls in unison and in timed relationship to a surface conveyor of a rounder bar system.

Another object of this invention is to provide an improved dough divider for delivering dough balls in unison and in timed relationship to a rounder bar system of a dough handling and baking system.

Other objects, features, and advantages of the present invention will become apparent upon reading the following specification, when taken in consideration with the accompanying drawings.

BRIEF DESCRIPTION OF THE DRAWINGS

FIG. 2 is a detail exploded illustration of one of the divider blades and a portion of the rotary support plate.

FIGS. 3A, 3B, 3C, and 3D are progressive schematic illustrations of the movement of a single divider blade.

FIG. 4 is a side view of a divider blade and portions of the dough delivery block and of the surface conveyor, showing how the divider blade moves the dough ball downwardly into contact with the surface conveyor.

DETAILED DESCRIPTION

Figure 1:
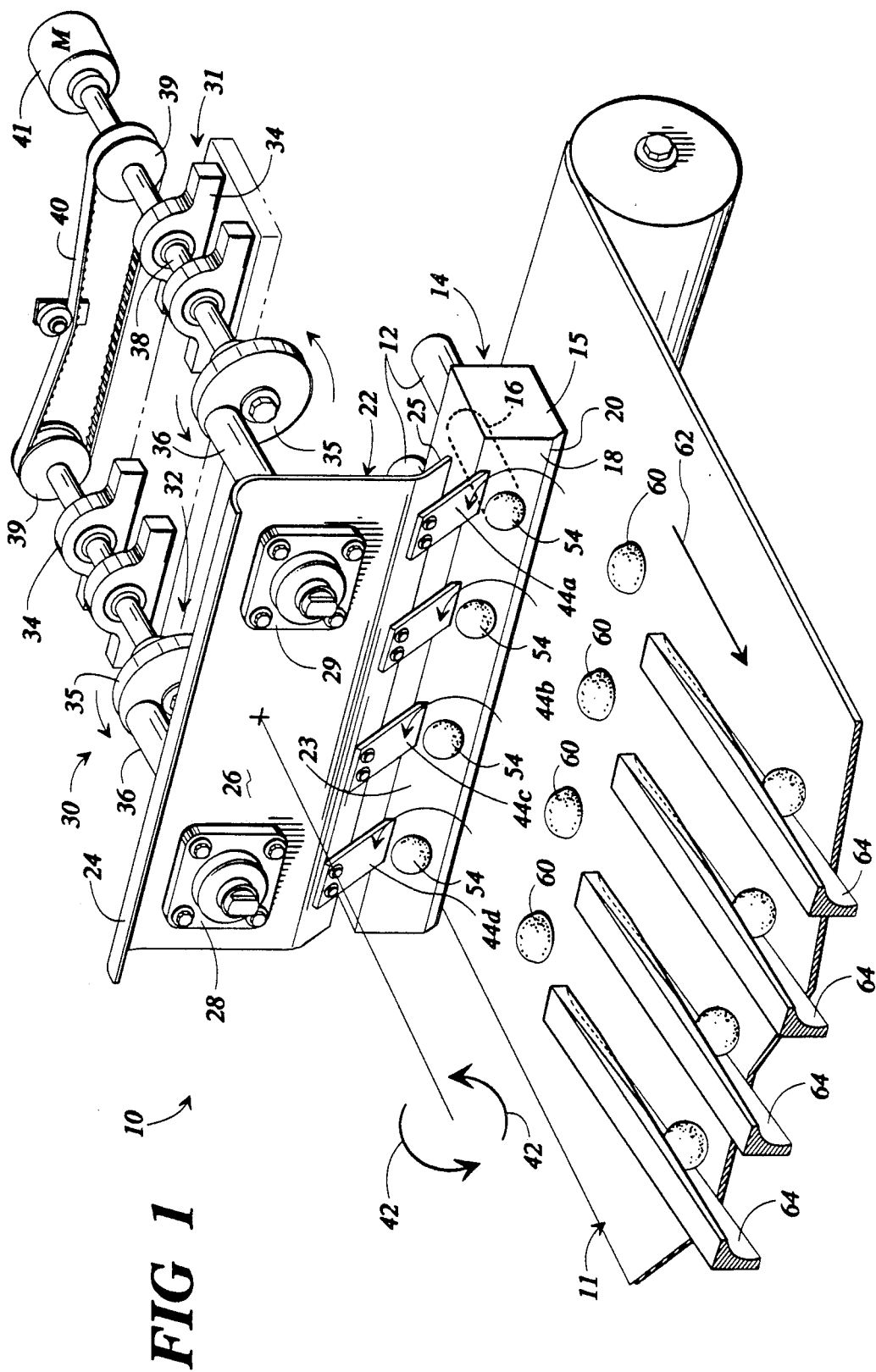
FIG. 1 is an exploded, perspective illustration of the dough divider, showing the dough divider positioned above the surface conveyor of a rounder bar system.

Referring now in more detail to the drawings, in which like numerals indicate like parts throughout the several views, FIG. 1 shows the dough divider 10 which is positioned above a rounder bar system 11 and which receives dough through the conduits 12 leading from a stuffing pump and separator manifold (not shown).

The dough divider includes dough delivery block 14 which is approximately rectangular, including end surfaces 15, top surface 16, rear surface and bottom surface (not shown in these figures), front surface or face 18, and sloped dough separation surface 19. Dough separation surface 19 is formed at an approximately 45 degree angle between the face 18 and the lower surface (not shown) of the dough delivery block, with an angle 20 formed between surfaces 18 and 19. The angle 20 forms the lower horizontal edge of the face 18.

Rotary support plate 22 is positioned above and in front of the face 18 of dough delivery bar 14, and includes an upper laterally extending strengthening flange 24 and a lower angled flange 25. The angled flange 25 extends from the main upright body 26 downwardly toward the face 18 of the dough delivery block. Bearings 28 and 29 are mounted to the main body 26 of support plate 22, and drive system 30 movably supports the rotary support plate 22. Drive system 30 includes a pair of cranks 31 and 32, with each crank including a support 34, crank disk 35, crank pin 36 which is offset from the center of crank disk 35, driven axle 38, and timing sheave 39. The timing sheaves 39 are interconnected by a timing belt 40, and motor 41 is mounted in driving relationship with respect to one of the driven axles 38. The crank pins 36, being offset from the axes of rotation of the crank disks 35, oscillate in a circular path around the axis of rotation of each crank 31, 32. Each crank pin 36 is mounted to a bearing 28, 29, so as to impart circular motion to the rotary support plate 22, as shown by arrows 42.

Divider blades 44A, 44B, 44C, and 44D are each mounted to the angled flange 25 of the rotary support plate 22. As illustrated in FIG. 2, a pair of elongated slots 45 are formed in the angled flange 25 at each blade position, and each of the divider blades 44 defines a pair of bolt openings 46 that are alignable with the slots 45. Bolts 48 are extended through the aligned slots and openings 45 and 46, so that each divider blade can be firmly mounted to the rotary support plate. The slots 45 permit the blades 44 to be extended closer toward or farther away from the face 18 of the dough delivery block 14. With this arrangement, the substantially flat divider blades are maintained at a substantially constant angle with respect to the face of the dough delivery block and the lower, straight slicing edge 50 of each divider blade 44 is maintained in constant, positive, biased relationship with respect to the face 18 of the dough delivery block 14.

As illustrated in FIGS. 1 and 3A-3D, each of the delivery conduits 12 leading from the dough manifold (not shown) communicates with a dough passage 21 which opens through the face 18 of the dough delivery block 14. The streams 51 of dough (FIG. 4) move through the passages 21 and move out through the dough outlet openings 23, to form protruding globs 54 of dough.

As illustrated in FIGS. 3A-3D, the divider blades 44 move in circular paths as indicated by arrows 56, 57, 58, and 59, in a downward arc across the dough outlet openings 23 (FIG. 3A), and continuing in a downward arc to the lower horizontal edge or angle 20 where the lower slicing edge 50 of the blade reaches the horizontal lower edge 20 of the face 18 of the dough delivery block, where the edge is closely spaced with respect to the upper flight of the surface conveyor 11. With this downward arcuate movement, the lower edge of the divider blades slices behind the glob 54 of dough protruding from the outlet opening 23, forming a dough ball 60 (FIG. 3B). The dough ball 60 is positively moved by the divider blade 44 downwardly into contact with the surface conveyor of the rounder bar assembly 11.

Once the divider blade reaches its bottom dead-center (FIG. 3B), it begins its upward arcuate movement (FIG. 3C), where it moves between the adjacent outlet openings 23 of the dough passages 21 while maintaining continuous surface-to-surface contact with the face 18 of the dough delivery block 14, and then reaches a position above the outlet opening 23, where it is ready for another cycle. The dough outlet openings 23 of the dough delivery block are spaced apart distances which are greater than the breadth of the divider blades, permitting the return of the divider blades without contacting the dough.

In the meantime, when the dough divider blades 44 reach the lower horizontal edge 20 of the face 18 of the dough delivery block 14, the dough ball 60 is still in contact with the divider blade 44 as it comes into contact with the upper flight of the surface conveyor 11. In the meantime, the dough divider blade 44 wipes the dough completely away from the face 18 of the dough delivery block 14, so that the dough will not cling to any surfaces of the dough delivery block. Further, the movement of the upper flight of the surface conveyor 11 as indicated by arrow 62 and the weight of the dough ball together with its downward momentum and surface contact with the surface conveyor causes the dough ball to begin its movement through the rounder bar system.

The rounder bar system includes a rounder bar 64 positioned in alignment with each dough outlet opening 23, so that each dough ball 60 is engaged by and tends to roll against the concave surface of its rounder bar, causing rotational movement of the dough ball on the upper flight of the conveyor. This conventional rounder bar function develops a skin on the dough ball.

While a preferred embodiment of the invention has been described and illustrated, it will be understood by those skilled in the art that variations and modifications thereof can be made without departing from the spirit and scope of the invention as set forth in the following claims.

I claim:

1. A method of dividing a plurality of streams of baker's dough into individual dough balls comprising:
   moving the streams of dough at substantially an equal rate through dough outlet openings formed in side-by-side relationship of a substantially flat surface of a dough delivery block to form a glob of dough protruding from each dough outlet opening;
   moving divider blades in unison in circular paths about the substantially flat surface in substantially continuous contact with said dough delivery block and downwardly across the dough outlet openings to simultaneously divide the glob of dough protruding from each outlet opening from each stream of dough into dough balls to deliver each dough ball downwardly to the flight of a surface conveyor;
   moving the dough balls on the surface conveyor away from the delivery block;
   as the divider blades move in their circular paths, moving the divider blades downwardly and toward the surface conveyor to a position where the dough balls are separated from the substantially flat surface of the delivery block and engage the surface conveyor before the divider blades lose contact with the dough balls; and
   carrying the dough balls with the surface conveyor away from contact with the divider blades.

2. The method of claim 1 and wherein the lower portion of said delivery block defines a dough separation surface forming an angle with respect to the flat vertical surface, and wherein the step of moving the divider blades downwardly across the outlet openings further comprises moving the divider blades downwardly across the angle.

3. The method of claim 1 and wherein the divider blades are substantially flat with a substantially straight divider edge, and wherein the step of moving the divider blades in circular paths comprises maintaining the divider blades each at substantially a constant angle with respect to the substantially flat surface of the dough delivery block with the edges of the divider blades in constant contact with the flat surface of the dough delivery block as the edge of the divider blades move about the substantially flat surface of the dough delivery block.

4. The method of claim 1 and wherein the divider blades are each mounted to a common divider blade support member, and wherein the step of moving the divider blades in unison in circular paths comprises moving the support member in a circular path.

5. The method of claim 1 and wherein the dough outlet openings of the dough delivery block are spaced from each other a distance greater than the breadths of the dough divider blades, and wherein the step of moving the divider blades in unison in circular paths comprises moving the divider blades upwardly between the dough outlet openings while in contact with the substantially flat surface of the dough delivery block.

6. A method of dividing a plurality of streams of baker's dough into individual dough balls comprising:
   moving the streams of dough at substantially equal rates through dough outlet openings formed in side-by-side relationship of a dough delivery block to form a glob of dough protruding from each dough outlet opening;
   moving divider blades in unison in substantially continuous contact with the dough delivery block in circular paths and downwardly across the dough outlet openings of the dough delivery block a distance sufficient to simultaneously divide the protruding globs of dough from the streams of dough into dough balls and to urge the dough balls downwardly into contact with the flight of a surface conveyor before the dough balls have lost contact with the divider blades;
   moving the dough balls with the surface conveyor; and
   retracting the divider blades upwardly from the surface conveyor with the upward movements of at least some of the divider blades located between the dough outlet openings.

7. The method of claim 6 and wherein the step of moving the divider blades in substantially continuous contact with dough delivery block comprises maintaining the divider blades at a predetermined angle with respect to the dough delivery block.

8. The method of claim 6 and wherein the dough delivery block defines a substantially flat upright delivery surface through which the dough outlet openings extend and a lower edge, and wherein the step of moving divider blades in unison downwardly across the dough outlet openings comprises moving the divider blades in substantially continuous contact with the dough delivery block downwardly across the dough outlet openings and to the lower edge of the dough delivery block so that the dough balls are prevented from clinging to the upright delivery surface of the dough delivery block.

* * * * *